US009070973B2

(12) United States Patent
Hanisch et al.

(10) Patent No.: US 9,070,973 B2

(45) Date of Patent: Jun. 30, 2015

(54) CONTROL VEHICLE FOR A ROAD TOLL SYSTEM

(71) Applicant: KAPSCH TRAFFICCOM AG, Vienna (AT)

(72) Inventors: Harald Hanisch, Vienna (AT); Robert Povolny, Vienna (AT); Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 222 days.

(21) Appl. No.: 13/688,804

(22) Filed: Nov. 29, 2012

(65) Prior Publication Data

US 2013/0141281 A1 Jun. 6, 2013

(30) Foreign Application Priority Data

Dec. 6, 2011 (EP) .................................... 11450149

(51) Int. Cl.

| | |
|---|---|
| *H04B 1/00* | (2006.01) |
| *H01Q 3/24* | (2006.01) |
| *G08G 1/017* | (2006.01) |
| *G07B 15/06* | (2011.01) |
| *H01Q 1/32* | (2006.01) |

(52) U.S. Cl.

CPC ................. *H01Q 3/24* (2013.01); *G08G 1/017* (2013.01); *G07B 15/063* (2013.01); *H01Q 1/3233* (2013.01)

(58) Field of Classification Search

CPC ........................................................ H01Q 3/24

USPC ................ 455/41.1–41.3, 63.4, 562.1, 569.2; 342/374

See application file for complete search history.

(56) References Cited

U.S. PATENT DOCUMENTS

| | | | | |
|---|---|---|---|---|
| 5,525,991 | A * | 6/1996 | Nagura et al. | 340/10.51 |
| 7,382,275 | B2 * | 6/2008 | Feldman et al. | 340/904 |
| 2006/0044161 | A1 | 3/2006 | Feldman et al. | |
| 2011/0140975 | A1 * | 6/2011 | Shigetomi | 343/713 |

FOREIGN PATENT DOCUMENTS

| | | | |
|---|---|---|---|
| DE | 10 2008 016 311 | A1 | 11/2008 |
| DE | 10 2009 011 276 | A1 | 9/2010 |
| WO | WO 2004/057541 | A1 | 7/2004 |

OTHER PUBLICATIONS

Extended European Search Report for corresponding European Patent Application No. 11 450 149.7, dated Apr. 27, 2012, 6pp.
European Office action issued in corresponding European Patent Application No. 11 450 149.7, dated Sep. 25, 2012, 5pp.

* cited by examiner

*Primary Examiner* — Tuan H Nguyen

(74) *Attorney, Agent, or Firm* — Fiala & Weaver P.L.L.C.

(57) ABSTRACT

A control vehicle for a road toll system on the basis of vehicle-mounted onboard units which can be polled via DSRC radio communications, with the control vehicle comprising at least one DSRC transceiver with at least two antenna systems, which are distributed with a mutual distance over the longitudinal direction of the control vehicle, for polling a passing on-board unit.

15 Claims, 3 Drawing Sheets

CONTROL VEHICLE FOR A ROAD TOLL SYSTEM

CROSS-REFERENCE TO RELATED APPLICATION(S)

This application claims priority to European Patent Application No. 11 450 149.7, filed on Dec. 6, 2011, the entire contents of which are hereby expressly incorporated by reference.

FIELD OF THE INVENTION

The present invention relates to a control vehicle for a road toll system on the basis of vehicle-mounted onboard units which can be polled via short-range or Dedicated Short Range Communications (DSRC) radio communications.

BACKGROUND

A conventional control vehicle is disclosed in US 2006/0044161 A1. The conventional control vehicle has several antennas which are arranged on the vehicle in different directions and can be selected via an antenna switch, in order to selectively access on-board units located in a specific range around the control vehicle via an antenna directed to this range.

DE 10 2008 016 311 A1 discloses how to set an antenna characteristic or an antenna array for a C2C or C2X communication depending on information sources in the vehicle, e.g. a digital road map, a measured value, an environmental sensor or an external signal.

In road toll systems of the above-mentioned type, on-board units (OBUs) installed in vehicles are used to charge vehicles for passing toll roads, for example in the form of road, zone or time tolls. For this purpose, the OBUs may be localized by geographically distributed radio beacons, e.g. infrared, RFID, DSRC, video or mobile network beacons (base stations), the narrow communication range of which uses short-range communications to localize OBUs, or by means of satellite navigation receivers in the single OBUs which can in addition be contacted via DSRC, e.g. for control purposes.

In order to control the proper function of the OBUs installed in the vehicles during operation, control vehicles which poll the OBUs of vehicles passing in moving traffic via the DSRC radio interface are frequently used. So far, such control vehicles have mostly been used only on highways which are characterized by one-way traffic. Anew approach now provides for the control of vehicles also on lower-level roads and in two-way traffic sections. However, when polling OBUs of the oncoming traffic, the time available for a polling process may be too short at high speeds due to the speeds adding up and the limited radio range of the DSRC radio interface. The invention identifies this problem and aims at providing a solution to this end.

SUMMARY

In some embodiments, the present invention is a control vehicle for a road toll system including at least one DSRC transceiver with at least two antenna systems distributed with a mutual distance over the longitudinal direction of the control vehicle and having omnidirectional characteristics or partially overlapping directional characteristics, to set up an uninterrupted radio communication for polling a passing on-board unit.

The invention utilizes the longitudinal side of the control vehicle in the direction of travel to extend the radio coverage range, which serves to extend the time available for potting a passing OBU, so that vehicles with a high relative speed to the control vehicle (also vehicles of the oncoming traffic) can be controlled as well.

According to some embodiments of the invention, a single DSRC transceiver operates all antenna systems via a sequentially controlled antenna switch, which reduces costs of transceivers, but requires a separate antenna switch. According to an alternative version of the invention, the antenna systems may be operated by two DSRC transceivers synchronized for a sequential handover of the DSRC radio communication. This version requires more transceivers, which, however, may have a uniform design and only need to be synchronized with one another via a data link.

The antenna systems may have a directional characteristic, for example, at an angle forward-and-sideward from the control vehicle, which is suitable for the control of vehicles passing laterally and vehicles of the oncoming traffic.

The directional characteristics of the antenna systems may partially overlap, thereby achieving an uninterrupted communication between the single antenna systems during the switchover or handover.

The antenna system mounted forward with respect to the direction of travel may have a more straightened directional characteristic than the antenna system mounted backward with respect to the direction of travel. As the antenna gain of an antenna increases with more directivity, this gain can be used to increase the radio coverage range of the control vehicle in the forward direction, while laterally, where a lower range is sufficient for the passing OBU, a higher beam angle and thus a longer passage area can be achieved.

In some embodiments of the invention, the directional characteristics of at least one antenna system used for a. DSRC radio communication may be controlled depending on information received during the DSRC radio communication. The information may, for example indicate a specific type or class of the vehicle carrying the on-board unit, e.g. whether it is a passenger car or a truck, or the number of axes of the vehicle, inferring the length or height of the vehicle and the location of its on-board unit. With trucks or buses, the on-board units are usually located at different higher altitudes above the road than with passenger cars, so that the antenna characteristic can be adjusted accordingly. In a some embodiments, the antenna system mounted forward with respect to the direction of travel receives the information to control the directional characteristic of at least one of the antenna systems mounted backward with respect to the direction of travel, so that the antennas, for example point more downward in the case of passenger cars, more upward in the case of trucks, and more sideward in the case of buses.

As an alternative or in addition, the control vehicle further may be equipped with at least one device for measuring and/or classifying a passing vehicle which may be arranged between at least two of the antenna systems. Such a measuring or classifying device then may also be used to control the directional characteristic of at least one antenna system depending on a dimension thereby determined or on a class of the vehicle thereby determined, which has the advantages mentioned above.

According to some embodiments of the invention, the antenna system mounted forward with respect to the direction of travel may emit a wake up message to the passing on-board unit, as is suitable for contacting OBUs which are set to a power saving mode (sleep mode) between the radio communications. Such OBUs require a certain time span for "waking up" into the operating mode, which can be triggered earlier by the antenna system mounted forward. The wake up message may be a BST message according to the CEN-DSRC standard or a WSA message according to the WAVE or ITS-G5 standard.

In some embodiments of the invention, the control vehicle may also be designed to write a control information into the on-board unit at the end of the polling. The control information may e.g. contain the time and place of the control or just be a "control flag" indicating the fact of a successful control and for example, advising to a next stationary or mobile control station that a further control is not required. The control information may be furnished with a timestamp indicating its period of validity. It is particularly advantageous, if the control information meets the "Compliance Check Communication" (CCC) standard ISO/TS 12813:2009 (Electronic fee collection—Compliance check communication for autonomous systems).

BRIEF DESCRIPTION OF THE DRAWINGS

The invention is described in further details below by means of exemplary embodiments represented in the attached drawings, in which.

DETAILED DESCRIPTION

Figure 1:
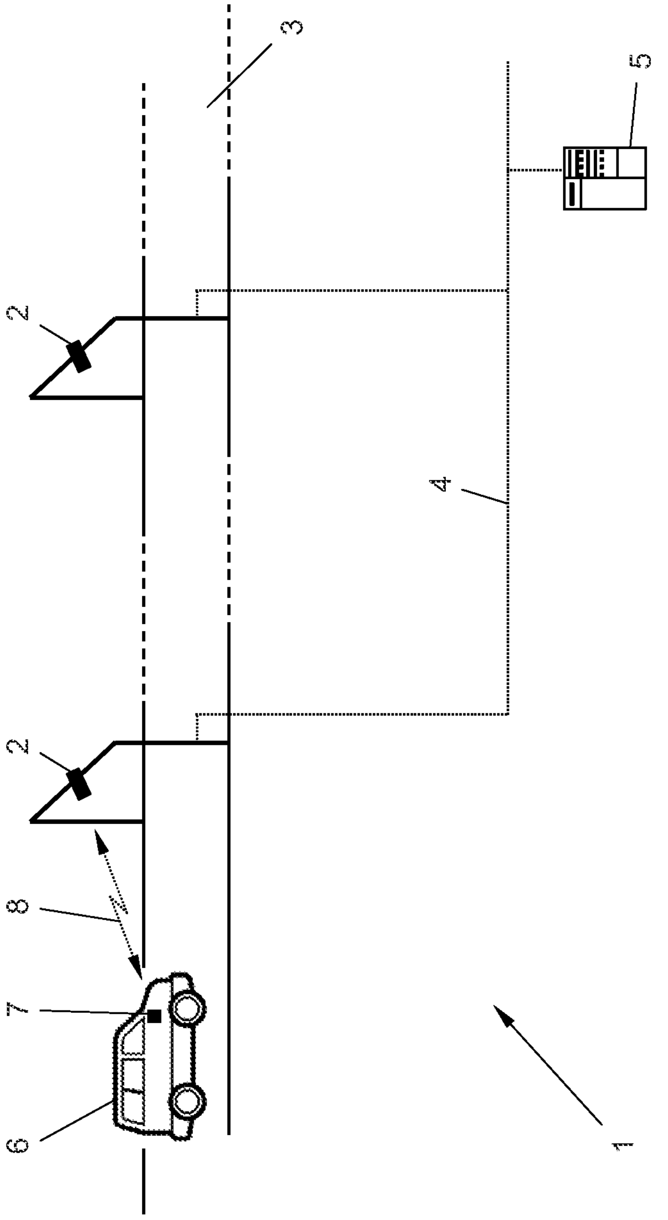
FIG. 1 shows a schematic and partial depiction of a road toll system, according to some embodiments of the present invention.

FIG. 1 shows a partial depiction of a road toll system 1 including a variety of geographically distributed radio beacons 2, which may be installed along toll roads 3 in mutual distances. The radio beacons 2 are connected to a control center 5 of the road toll system via data links 4. The road toll system 1, in particular its radio beacons, charges vehicles 6 for passing toll roads, e.g. toll roads 3.

Every vehicle 6 is equipped with an on-board unit (OBU) 7, which, when passing a radio beacon 2, establishes a short distance radio communication 8 (e.g., DSRC) to the radio beacon. The OBU 7 performs a toll transaction, which is reported to the control center 5 via the data link 4 and/or is stored in the OBU 7.

The radio beacons 2, the OBUs 7 and all their internal DSRC transceivers for handling the DSRC radio communications 8 may be designed according to all known DSRC standards, in particular CEN-DSRC, ITS-G5 or wireless access in a vehicle environment (WAVE). Every DSRC radio communication 8 carried out when a radio beacon 2 is passed may debit a specific user fee from a credit account in the control center 5 and/or the OBU 7, thus constituting a "debit transaction". However, the DSRC radio communications 8 may also constitute identification, maintenance, software updating or similar transactions of the road toll system 1.

In particular, the DSRC radio communications 8 may also be used for polling data stored in the OBUs 7, such as master data, identification data, transaction data, log data, etc. Such polls may not only be carried out from the stationary radio beacons 2, hut also from mobile radio beacons 2 in the form of control vehicles 9, which are travelling along together with the vehicles 6, in the road toll system 1.

Further, polls of OBUs 7 via DSRC radio communications 8 may also be carried out in satellite navigation-based, for example, global navigation satellite system (GNSS) in the road toll systems 1 in which the OBUs 7 are autonomously localized not by a network of terrestrial radio beacons 2, but by means of a GNSS receiver, and transmit their location or resulting toll transactions to the control center 5, e.g. via the radio beacon network or a separate mobile network. The OBUs 7 may be equipped with DSRC transceivers for polls by radio beacons 2 or control vehicles 9. In some embodiments, the data polled of GNSS-based OBUs 7 meet the "Compliance Check Communication" (CCC) standards ISO/TS 12813:2009 (Electronic fee collection—Compliance check communication for autonomous systems). Thus, the control vehicle 9 described below is suitable for interacting both with beacon-based and satellite-based road toll systems 1.

Figure 2:
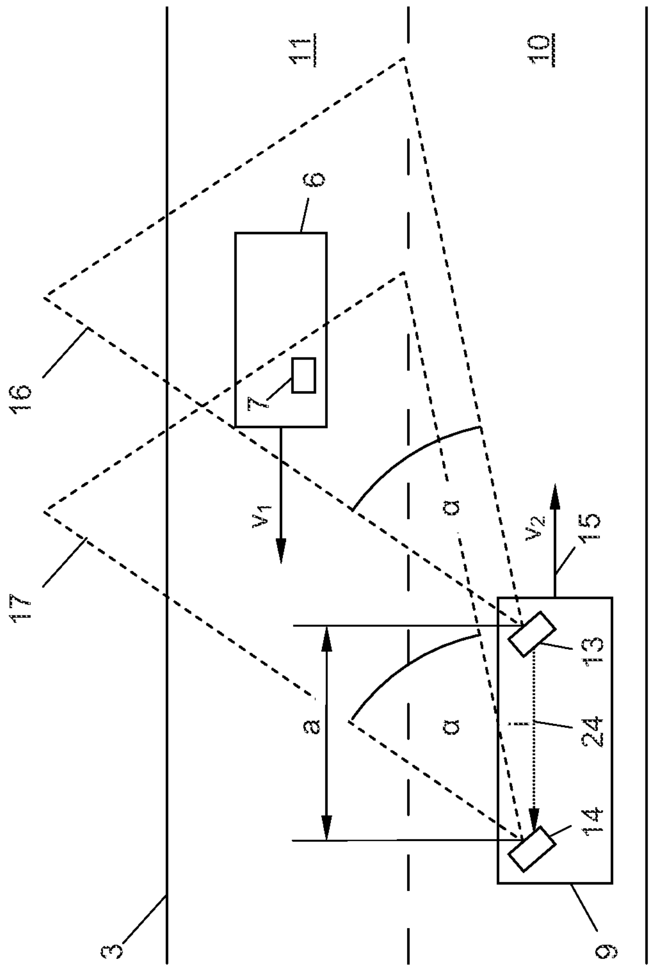
FIG. 2 and FIG. 3 show two embodiments of the control vehicle of the invention with different directional characteristics of the antenna systems in schematic top views.

FIG. 2 shows some embodiments of such a control vehicle 9 moving on a lane 10 of the toll road 3 at a speed v2 and controlling the OBU 7 of a vehicle 6 passing at the speed v1 on the opposite lane 11 of the toll road 3. The relative speed between the control vehicle 9 and the controlled vehicle 6 thus is v1+v2, which can be up to 300 km/h and more on expressways, highways, etc.

The control vehicle 9 has (at least) one DSRC transceiver, which similar to a radio beacon 2, can poll the passing OBU 7 by a DSRC radio communication 8. The DSRC transceiver 12 is equipped with (at least) two antenna systems 13, 14, which are distributed in a mutual distance "a" in the longitudinal direction 15 of the control vehicle 9 on the vehicle.

In order to utilize the longitudinal side of the control vehicle 9 to the fullest possible, the antenna systems 13, 14 may be arranged at the front and rear end of the control vehicle 9, and with right-hand traffic at the tell side of the vehicle (or with left-hand traffic at the right side of the vehicle), to provide for good coverage of overtaking vehicles 6 or vehicles 6 of the oncoming traffic.

Figure 3:
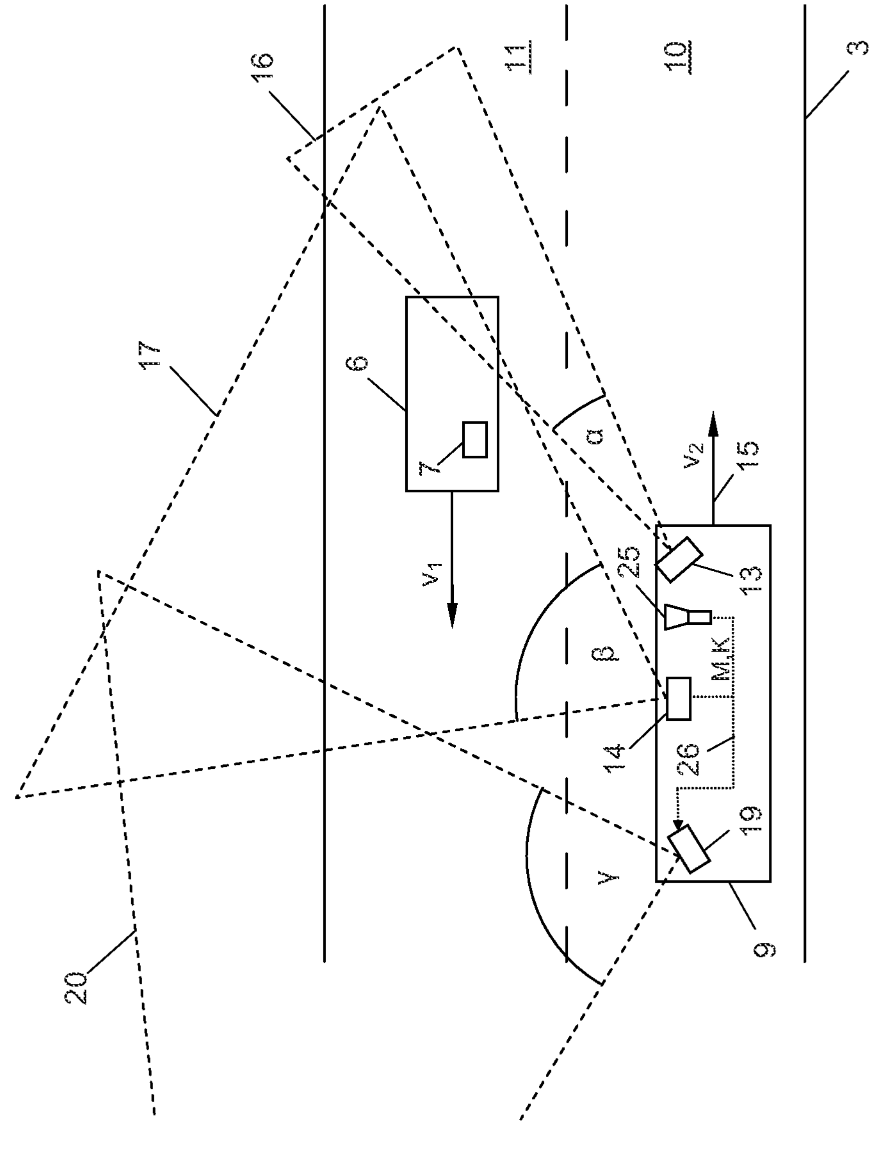

The antenna systems 13, 14 each may have a omnidirectional characteristic or, as shown, a directional characteristic 16, 17, which is specifically aligned to such overtaking vehicles 6 and vehicles 6 of the oncoming traffic: The directional characteristics 16, 17 may be directed at an angle forward-and-sideward and may have the same beam angle $\alpha$ (FIG. 2) or different beam angles $\alpha$, $\beta$, $\gamma$ (FIG. 3). As shown, the directional characteristics 16, 17 partially overlap in their border areas, thereby establishing a continuous radio coverage and uninterrupted radio communications 8 with passing OBUs 7.

Figure 4:
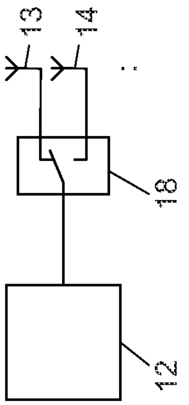
FIG. 4 and FIG. 5 show embodiments of the control vehicles of FIG. 2 and FIG. 3 in block diagrams, respectively.

As shown in FIG. 4, the antenna systems 13, 14 may be operated in an antenna diversity process, carry the same signal and have the same DSRC transceiver 12. In the embodiments of FIG. 4, the antenna systems 13, 14 are sequentially operated via an antenna switch 18 to initiate a radio communication 8. The operation of the antenna system 13, 14, is started via the front antenna system 13 in its radio coverage range 16 and is continued and terminated via the rear antenna system 14 in its radio coverage range 17.

FIG. 3 shows an embodiment, where the antenna system 13 mounted forward with respect to the direction of travel 15 has a more directional characteristic 16 than the antenna systems mounted backward with respect to the direction of travel, that is, an antenna system 14 mounted in the middle and an antenna system 19 mounted at the back. All antenna systems 13, 14, 19 may have different beam angles $\alpha$, $\beta$, $\gamma$ of their directional characteristics 16, 17, 20. The front antenna system 13 may be in particular used to emit a "wake up message" to passing OBUs 7, for example a BST message (Beacon Service Table) according to the CEN-DSRC standard or a WSA message (Wave Service Table Announcement) according to the WAVE or ITS-G5 standard, thereby having the control vehicle 9 "wake up" OBUs 7, which between the radio communications 8 with the radio beacons 2 are set to a power saving sleep mode, using the front antenna system 13, with the antenna systems 14, 19 following during the passage carrying out the further radio communication 8.

Figure 5:
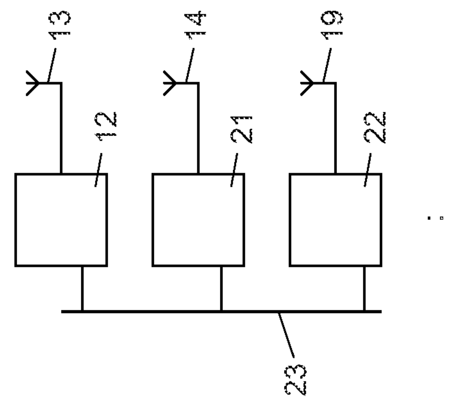

FIG. 5 shows an embodiment, where each antenna system 13, 14, 19, etc., is operated by its own DSRC transceiver 12, 21, 22, etc. The DSRC transceivers 12, 21, 22 are synchronized with one another via an internal link 23 so that they carry out a handover of the DSRC radio communication 8 from a DSRC transceiver 12 with its antenna system 13 to the next DSRC transceiver 14 with its antenna system 21, or from this transceiver to the next transceiver 22 with its antenna system 19, etc.

The handover may be included in the wake up message being received and processed by the front DSRC transceiver 12, with the remaining part of the radio communication 8 being received and processed by the rear transceivers 21, 22. The handover may be included in the first data packages of the radio communication 8 being sent back and forth between the OBU 7 and the control vehicle 9 by the first transceiver 12, with the further data packages being processed by the rear transceivers 21, 22.

In a further embodiment, the antenna systems 13, 14, 19 may have adjustable directional characteristics 16, 17 20, e.g. in the form of controllable antenna arrays ("smart antennas") or switchable single antennas.

Some embodiments permit controlling the directional characteristic of one, two or all of the antenna systems 13, 14, 19, for example, those of the rear antenna systems (4, 19, depending on information "i" (FIG. 2) received during the DSRC radio communication 8. The information "i" may for example indicate the type or class of the vehicle 6 of the OBU 7, i.e. whether it is a passenger car or a truck, or the number of axes of the vehicle. The information i may then be used to determine the location of the OBU 7 at the vehicle 6 and thus the location of the OBU 7 relative to the lane 11 and afterwards relative to the control vehicle 9, in particular the altitude of the OBU 7 above the road 3: With a truck, the OBU 7 is usually located higher than with a bus, and with a bus higher than with a passenger car, etc. The directional characteristics 16, 17, 20 may then be adjusted in their angle and/or their height to the lane 10 and/or in their beam angles $\alpha$, $\beta$, $\gamma$ accordingly (arrow 24) depending on the received information i, in order to achieve an optimal radio communication 8 with the OBU 7.

In further embodiments, the control vehicle 9 may alternatively or additionally comprise at least one device 25 for measuring and/or classifying the vehicle 6. The device may be arranged between the antenna systems 13, 14, 19. The device 25 may also be used to control the directional characteristics 16, 17, 20 of the antenna systems 13, 14, 19, depending on a determined dimension M of the vehicle 6 and/or of a determined class K of the vehicle 6 (arrow 26). For example, a large vehicle height can indicate that the directional characteristics 17, 20 of the antenna systems 14, 19 must be directed upwards accordingly and/or the beam angles $\beta$, $\gamma$ must be extended accordingly.

The control vehicle 9 may also write a control information into the OBU 7 at the end of a DSRC radio communication 8. The control information may be recorded (written) in the OBU 7 at the end of the DSRC radio communication 8 by the antenna system 14 or 19 last mounted in the direction of travel 15. The control information may, for example, contain the time and place of the control. The control information may act as a "control flag" indicating a successful control. The control information may also be furnished with a timestamp indicating its period of validity or its expiration.

The control information may be displayed by the OBU 7 for the driver and e.g. instruct the driver to call at the next stationary control station in case of an adverse control result. However, the control information may also be polled by a next stationary control station, e.g. radio beacon 2, or by another control vehicle 9, indicating the result of the previous control to the effect that e.g. a repeated control is not required, which means that a direct data exchange between the single control vehicles or stations is not necessary, as the control information is stored in the OBU 7.

IN some embodiments for a road toll systems, which are not based on satellite navigation, the DSRC radio beacons 2 may be replaced with other short-range beacons 2 for localizing the OBUs 7, e.g. infrared, RFID, DSRC, video or mobile network beacons (base stations).

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, hut is rather intended to cover any changes, adaptations or modifications which are within the scope and spirit of the invention as defined by the appended claims.

What is claimed is:

1. A control vehicle for a road toll system comprising: at least one Dedicated Short Range Communications (DSRC) transceiver with at least two antenna systems, wherein the antenna systems are arranged at the front and rear ends of the control vehicle and have omnidirectional characteristics or partially overlapping directional characteristics, to set up an uninterrupted radio communication for polling a passing on-board unit, wherein the at least one DSRC transceiver is configured to initiate the radio communication with said on-board unit via an antenna system mounted forward with respect to the direction of travel of the control vehicle and to continue the radio communication via at least one antenna system mounted backward with respect to the direction of travel of the control vehicle.

2. The control vehicle according to claim 1, wherein a single DSRC transceiver operates all antenna systems via a sequentially controlled antenna switch.

3. The control vehicle according to claim 1, wherein the antenna systems are operated by their own respective DSRC transceivers, and synchronized for a sequential handover of the DSRC radio communication.

4. The control vehicle according to claim 1, wherein each of the antenna systems has a directional characteristic.

5. The control vehicle according to claim 4, wherein the directional characteristic is directed at an angle forward-and-sideward from the control vehicle.

6. The control vehicle according to claim 4, wherein one of the antenna systems which is mounted forward with respect to the direction of travel has a more directional characteristic than another of the antenna systems which is mounted backward with respect to the direction of travel.

7. The control vehicle according to claim 4, wherein the directional characteristic of at least one antenna system is controlled based on information received during the DSRC radio communication.

8. The control vehicle according to claim 7, wherein the antenna system mounted forward with respect to the direction of travel receives said information to control the directional characteristic of at least one of the antenna systems mounted backward with respect to the direction of travel.

9. The control vehicle according to claim 1, wherein the directional characteristics of the antenna systems partially overlap.

10. The control vehicle according to claim 1, further comprising at least one device for one or more of measuring and classifying a passing vehicle.

11. The control vehicle according to claim 10, wherein said device is arranged between at least two of the antenna systems.

12. The control vehicle according to claim 10, wherein the directional characteristic of at least one antenna system is controlled by one or more of a dimension of the vehicle measured by the device and a class of the vehicle determined by the device.

13. The control vehicle according to claim 1, wherein the antenna system mounted forward with respect to the direction of travel emits a wake up message to the passing on-board unit.

14. The control vehicle according to claim 13, wherein the wake up message is a BST message according to the CEN-DSRC standard, or a WSA message according to the WAVE or ITS-G5 standard.

15. The control vehicle according to claim L further comprising means of writing a control information into the on-board unit at the end of the polling with a timestamp indicating its period of validity.

* * * * *

UNITED STATES PATENT AND TRADEMARK OFFICE

CERTIFICATE OF CORRECTION

PATENT NO. : 9,070,973 B2
APPLICATION NO. : 13/688804
DATED : June 30, 2015
INVENTOR(S) : Harald Hanisch et al.

It is certified that error appears in the above-identified patent and that said Letters Patent is hereby corrected as shown below:

Claims

In column 7, line 25, in claim 15, delete “claim L” and insert -- claim 1, --, therefor.

Signed and Sealed this
Twenty-fourth Day of November, 2015

Michelle K. Lee
*Director of the United States Patent and Trademark Office*